(12) United States Patent
Sen et al.

(10) Patent No.: US 11,900,070 B2
(45) Date of Patent: Feb. 13, 2024

(54) PRODUCING EXPLAINABLE RULES VIA DEEP LEARNING

(71) Applicant: International Business Machines Corporation, Armonk, NY (US)

(72) Inventors: Prithviraj Sen, San Jose, CA (US); Siddhartha Brahma, San Jose, CA (US); Yunyao Li, San Jose, CA (US); Laura Chiticariu, San Jose, CA (US); Rajasekar Krishnamurthy, Campbell, CA (US); Shivakumar Vaithyanathan, San Jose, CA (US); Marina Danilevsky Hailpern, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 564 days.

(21) Appl. No.: 16/780,721

(22) Filed: Feb. 3, 2020

(65) Prior Publication Data

US 2021/0240917 A1    Aug. 5, 2021

(51) Int. Cl.
| | | |
|---|---|---|
| *G06F 40/40* | (2020.01) | |
| *G06F 40/284* | (2020.01) | |
| *G06F 40/56* | (2020.01) | |
| *G06F 40/16* | (2020.01) | |
| *G06F 40/289* | (2020.01) | |
| *G06N 20/00* | (2019.01) | |
| *G06N 3/084* | (2023.01) | |

(Continued)

(52) U.S. Cl.
CPC .......... *G06F 40/56* (2020.01); *G06F 18/2155* (2023.01); *G06F 40/16* (2020.01); *G06F 40/289* (2020.01); *G06N 3/084* (2013.01); *G06N 20/00* (2019.01); *G06N 20/10* (2019.01)

(58) Field of Classification Search
CPC ........ G06F 16/35; G06F 40/30; G06F 40/284; G06F 16/3344; G06F 16/353; G06F 40/20; G06N 3/08; G06N 3/0445; G06N 20/00; G06N 3/084; G06N 3/02; G06N 5/04

See application file for complete search history.

(56) References Cited

U.S. PATENT DOCUMENTS 8,504,361 B2   8/2013 Collobert et al.
10,747,761 B2 *  8/2020 Zhong ...................... G06N 3/08
(Continued)

FOREIGN PATENT DOCUMENTS

| CN | 104881435 B | 5/2018 |
| CN | 110021431 A | 7/2019 |
| WO | 2018208813 A1 | 11/2018 |

OTHER PUBLICATIONS

Chen et al., AnchorViz: Facilitating classifier error discovery through interactive semantic data exploration, Mar. 2018, In23rd International Conference on Intelligent User Interfaces Mar. 5, 2018 (pp. 269-280).*

(Continued)

*Primary Examiner* — Olujimi A Adesanya
(74) *Attorney, Agent, or Firm* — Zilka-Kotab, P.C.

(57) ABSTRACT

A computer-implemented method according to one embodiment includes receiving, at a deep neural network (DNN), a plurality of sentences each having an associated label; training the DNN, utilizing the plurality of sentences and associated labels; and producing a linguistic expression (LE) utilizing the trained DNN.

24 Claims, 9 Drawing Sheets

(51) Int. Cl.
  *G06N 20/10* (2019.01)
  *G06F 18/214* (2023.01)

(56) References Cited

U.S. PATENT DOCUMENTS

| | | | | |
|---|---|---|---|---|
| 11,151,175 | B2* | 10/2021 | Lourentzou | G06F 16/313 |
| 2009/0210218 | A1* | 8/2009 | Collobert | G06F 40/284 |
| | | | | 704/9 |
| 2017/0061330 | A1* | 3/2017 | Kurata | G06F 16/3344 |
| 2017/0278510 | A1* | 9/2017 | Zhao | G06F 40/30 |
| 2017/0365252 | A1* | 12/2017 | Ushio | G10L 15/063 |
| 2018/0165554 | A1* | 6/2018 | Zhang | G06K 9/6256 |
| 2018/0268298 | A1* | 9/2018 | Johansen | G06N 5/04 |
| 2018/0336183 | A1* | 11/2018 | Lee | G06N 3/08 |
| 2019/0147369 | A1 | 5/2019 | Gupta et al. | |
| 2019/0164057 | A1 | 5/2019 | Doshi | |
| 2019/0188260 | A1* | 6/2019 | Hewitt | G06F 40/284 |
| 2019/0205733 | A1* | 7/2019 | Ghaeini | G06K 9/6267 |
| 2019/0377972 | A1* | 12/2019 | Liu | G06F 18/41 |
| 2020/0050696 | A1* | 2/2020 | Mowatt | G06F 16/176 |
| 2020/0125673 | A1* | 4/2020 | Aharonov | G06N 3/0454 |
| 2020/0134461 | A1* | 4/2020 | Chai | G06N 3/084 |
| 2020/0151516 | A1* | 5/2020 | Anushiravani | A61B 5/4803 |

OTHER PUBLICATIONS

Yang et al., "HEIDL: learning linguistic expressions with deep learning and human-in-the-loop", Jul. 2018, InProceedings of the 57th Annual Meeting of the Association for Computational Linguistics: System Demonstrations Jul. 2019 (pp. 135-140).*

Smith et al., "Closing the loop: User-centered design and evaluation of a human-in-the-loop topic modeling system", Mar. 2018, In23rd International Conference on Intelligent User Interfaces Mar. 5, 2018 (pp. 293-304).*

Pumnea, "Advancing Duplicate Question Detection with Deep Learning", Oct. 2018, Master Thesis, pp. 1-101.*

Aklilu, "Exploring Neural Word embeddings for Amharic Language", 2019, Master thesis, pp. 1-89.*

Yang et al., "A Study on Interaction in Human-in-the-Loop Machine Learning for Text Analytics", Mar. 20, 2019, InIUI Workshops Mar. 20, 2019., pp. 1-7.*

Samek et al., "Explainable Artificial Intelligence: Understanding, Visualizing and Interpreting Deep Learning Models," arXiv, Aug. 28, 2017, 8 pages, retrieved from https://arxiv.org/abs/1708.08296.

Bonanno et al., "An approach to explainable deep learning using fuzzy inference," Proceedings of SPIE, vol. 10207, 2017, pp. 102070D-1-102070D-5.

Amores, J., "Multiple instance classification: Review, taxonomy and comparative study," Artificial Intelligence, vol. 201, Jun. 19, 2013, pp. 81-105.

Bastings et al., "Interpretable Neural Predictions with Differentiable Binary Variables," Proceedings of the 57th Annual Meeting of the Association for Computational Linguistics, Jul. 28-Aug. 2, 2019, pp. 2963-2977.

Campero et al., "Logical Rule Induction and Theory Learning Using Neural Theorem Proving," arXiv, Sep. 12, 2018, 11 pages, retrieved from https://arxiv.org/abs/1809.02193.

Chakrabarti et al., "Enhanced hypertext categorization using hyperlinks," ACM SIGMOD, 1998, pp. 1-12.

Garcez et al., "Symbolic knowledge extraction from trained neural networks: A sound approach," Artificial Intelligence, vol. 125, 2001, pp. 155-207.

Dietterich et al., "Solving the multiple instance problem with axis-parallel rectangles," Artificial Intelligence, vol. 89, 1997, pp. 31-71.

Dong et al., "Neural Logic Machines," Conference paper at ICLR, 2019, pp. 1-22.

Evans et al., "Learning Explanatory Rules from Noisy Data," Journal of Artificial Intelligence Research, vol. 61, Jan. 2018, pp. 1-64.

Franca et al., "Fast relational learning using bottom clause propositionalization with artificial neural networks," Machine Learning, vol. 94, 2014, pp. 81-104.

Gal et al., "A Theoretically Grounded Application of Dropout in Recurrent Neural Networks," 30th Conference on Neural Information Processing Systems (NIPS), 2016, pp. 1-9.

Getoor et al., "Introduction to Statistical Relational Learning," The MIT Press, 2007, pp. 1-20, retrieved from https://www.semanticscholar.org/paper/Introduction-to-Statistical-Relational-Learning-and-Getoor-Taskar/ced4db5d559d4614efb5bbbcef353f7aac7a4f25.

Kazemi et al., "ReINN: A Deep Neural Model for Relational Learning," 32nd AAAI Conference on Artificial Intelligence, 2018, pp. 6367-6375.

Khot et al., "Learning Markov Logic Networks via Functional Gradient Boosting," ICDM, 2011, 11 pages, retrieved from http://ftp.cs.wisc.edu/machine-learning/shavlik-group/khot.icdm11.pdf.

Kok et al., "Learning Markov Logic Networks Using Structural Motifs," Proceedings of the 27th International Conference on Machine Learning, 2010, 8 pages.

Lu et al., "Link-based Classification," 20th International Conference on Machine Learning, 2003, 8 pages.

Manhaeve et al., "DeepProbLog: Neural Probabilistic Logic Programming," 32nd Conference on Neural Information Processing Systems (NeurIPS), 2018, pp. 1-11.

Merity et al., "Regularizing and Optimizing LSTM Language Models," Conference Paper at ICLR, 2018, pp. 1-13.

Mikolov et al., "Distributed Representations of Words and Phrases and their Compositionality," Proceedings of the 26th International Conference on Neural Information Processing Systems, Dec. 2013, pp. 1-9, retrieved from https://dl.acm.org/doi/10.5555/2999792.2999959.

Muggleton, S., "Learning from positive data," Inductive Logic Programming, 1996, pp. 1-21, retrieved from http://citeseerx.ist.psu.edu/viewdoc/download?doi=10.1.1.119.5121&rep=rep1&type=pdf.

Pennington et al., "GloVe: Global Vectors for Word Representation," Conference on Empirical Methods in Natural Language Processing (EMNLP), Oct. 25-29, 2014, pp. 1532-1543.

Richardson et al., "Markov logic networks," Machine Learning, vol. 62, 2006, pp. 107-136.

Rocktaschel et al., "End-to-End Differentiable Proving," NIPS, 2017, pp. 1-15, retrieved from https://arxiv.org/abs/1705.11040.

Sourek et al., "Lifted Relational Neural Networks: Efficient Learning of Latent Relational Structures," Journal of Artificial Intelligence Research, vol. 62, May 2018, pp. 69-100.

Srivastava et al., "Dropout: A Simple Way to Prevent neural Networks from Overfitting," Journal of Machine Learning Research, vol. 15, 2014, pp. 1929-1958.

Voorhees et al., "The TREC-8 Question Answering Track," Natural Language Engineering, vol. 7. Issue. 4, Dec. 2001, 8 pages, retrieved from http://dx.doi.org/10.1017/S1351324901002789.

Wang et al., "Revisiting Multiple Instance Neural Networks," arXiv, Oct. 8, 2016, pp. 1-9, retrieved from https://arxiv.org/abs/1610.02501.

Yang et al., "Differentiable Learning of Logical Rules for Knowledge Base Reasoning," 31st Conference on Neural Information Processing Systems (NIPS), 2017, pp. 1-10.

Muggleton et al., "Meta-Interpretive Learning from noisy images," Machine Learning, May 7, 2018, 22 pages.

Cropper et al., "Logical minimisation of meta-rules within Meta-Interpretive Learning," Inductive Logic Programming, Dec. 27, 2015, pp. 1-13, retrieved from https://link.springer.com/chapter/10.1007/978-3-319-23708-4_5.

Jurafsky et al., "Speech and Language Processing," Stanford University, 3rd edition draft, Oct. 16, 2019, pp. 1-613, retrieved from https://web.stanford.edu/~jurafsky/slp3/.

Boehm et al., "SystemML: Declarative Machine Learning on Spark," Proceedings of the VLDB Endowment, vol. 9, No. 13, 2016, pp. 1425-1436.

Kingma et al., "Adam: A Method for Stochastic Optimization," Conference Paper at ICLR, 2015, pp. 1-15.

(56) References Cited

OTHER PUBLICATIONS

Nair et al., "Rectified Linear Units Improve Restricted Boltzmann Machines," Proceedings of the 27th International Conference on Machine Learning, 2010, 8 pages.

Strobelt et al., "Visual Analysis of Hidden State Dynamics in Recurrent Neural Networks," arXiv, Jun. 23, 2016, 7 pages, retrieved from https://scholar.harvard.edu/files/gehrmann/files/lstmvis.pdf.

Github, "Neural-LP," GitHub, retrieved on Jan. 16, 2020, from https://github.com/fanyangxyz/Neural-LP, 2 pages.

Starlinglab, "BoostSRL: 'Boosting for Statistical Relational Learning'," StARLinG Lab., retrieved on Jan. 16, 2020, from https://starling.utdallas.edu/software/boostsrl/, 3 pages.

Github, "Revisiting Multiple Instance Neural Networks," GitHub, retrieved on Jan. 16, 2020, from https://github.com/yanyongluan/MINNs, 2 pages.

Github, "Metagol," GitHub, retrieved on Jan. 16, 2020, from https://github.com/metagol/metagol, 5 pages.

Github, "Metagol_NT," GitHub, retrieved on Jan. 16, 2020, from https://github.com/atnezhad/Metagol_NT, 2 pages.

Srinivasan, A., "The Aleph Manual," Version 4 and above, Mar. 13, 2007, 49 pages, retrieved from http://www.cs.ox.ac.uk/activities/programinduction/Aleph/aleph.html.

Kok et al., "The Alchemy System for Statistical Relational AI: Developer's Manual," University of WA, Jan. 15, 2007, 12 pages, retrieved from https://alchemy.cs.washington.edu/code/lsmcode.tgz.

Kok et al., "The Alchemy System for Statistical Relational AI: User Manual," University of WA, Aug. 3, 2007, 13 pages, retrieved from https://alchemy.cs.washington.edu/code/lsmcode.tgz.

Sumner et al., "The Alchemy Tutorial," University of WA, Jun. 20, 2007, 17 pages, retrieved from https://alchemy.cs.washington.edu/code/lsmcode.tgz.

* cited by examiner

PRODUCING EXPLAINABLE RULES VIA DEEP LEARNING

BACKGROUND

The present invention relates to predictive models, and more specifically, this invention relates to training and deploying predictive models.

Predictive models are applied to a wide variety of modern-day applications, such as related product identification, spam email identification, etc. However, current predictive models are unintelligible to human users or equivalent processes/applications, which make such models difficult to view, understand, and modify. As a result, additional computing resources are needed to interact with such predictive models, and predictive models may not be optimized or produced efficiently because they are too difficult to understand.

SUMMARY

A computer-implemented method according to one embodiment includes receiving, at a deep neural network (DNN), a plurality of sentences each having an associated label; training the DNN, utilizing the plurality of sentences and associated labels; and producing a linguistic expression (LE) utilizing the trained DNN.

According to another embodiment, a computer program product for producing explainable rules via deep learning includes a computer readable storage medium having program instructions embodied therewith, where the computer readable storage medium is not a transitory signal per se, and where the program instructions are executable by a processor to cause the processor to perform a method including receiving, utilizing the processor at a deep neural network (DNN), a plurality of sentences each having an associated label; training the DNN, utilizing the processor and the plurality of sentences and associated labels; and producing a linguistic expression (LE) utilizing the trained DNN and the processor.

According to another embodiment, a system includes a processor; and logic integrated with the processor, executable by the processor, or integrated with and executable by the processor, where the logic is configured to receive, at a deep neural network (DNN), a plurality of sentences each having an associated label; train the DNN, utilizing the plurality of sentences and associated labels; and produce a linguistic expression (LE) utilizing the trained DNN.

According to another embodiment, a computer-implemented method includes identifying a collection of sentences having labels; inputting the sentences into a deep neural network (DNN) having several layers, the DNN analyzing the sentences and producing linguistic expressions (LEs) corresponding to the sentences; and in view of input from a human expert, modifying the linguistic expressions, wherein the modified linguistic expressions form a predictive model that, given an unlabeled sentence, predicts one or more labels for the unlabeled sentence.

Other aspects and embodiments of the present invention will become apparent from the following detailed description, which, when taken in conjunction with the drawings, illustrate by way of example the principles of the invention.

DETAILED DESCRIPTION

Figure 1:
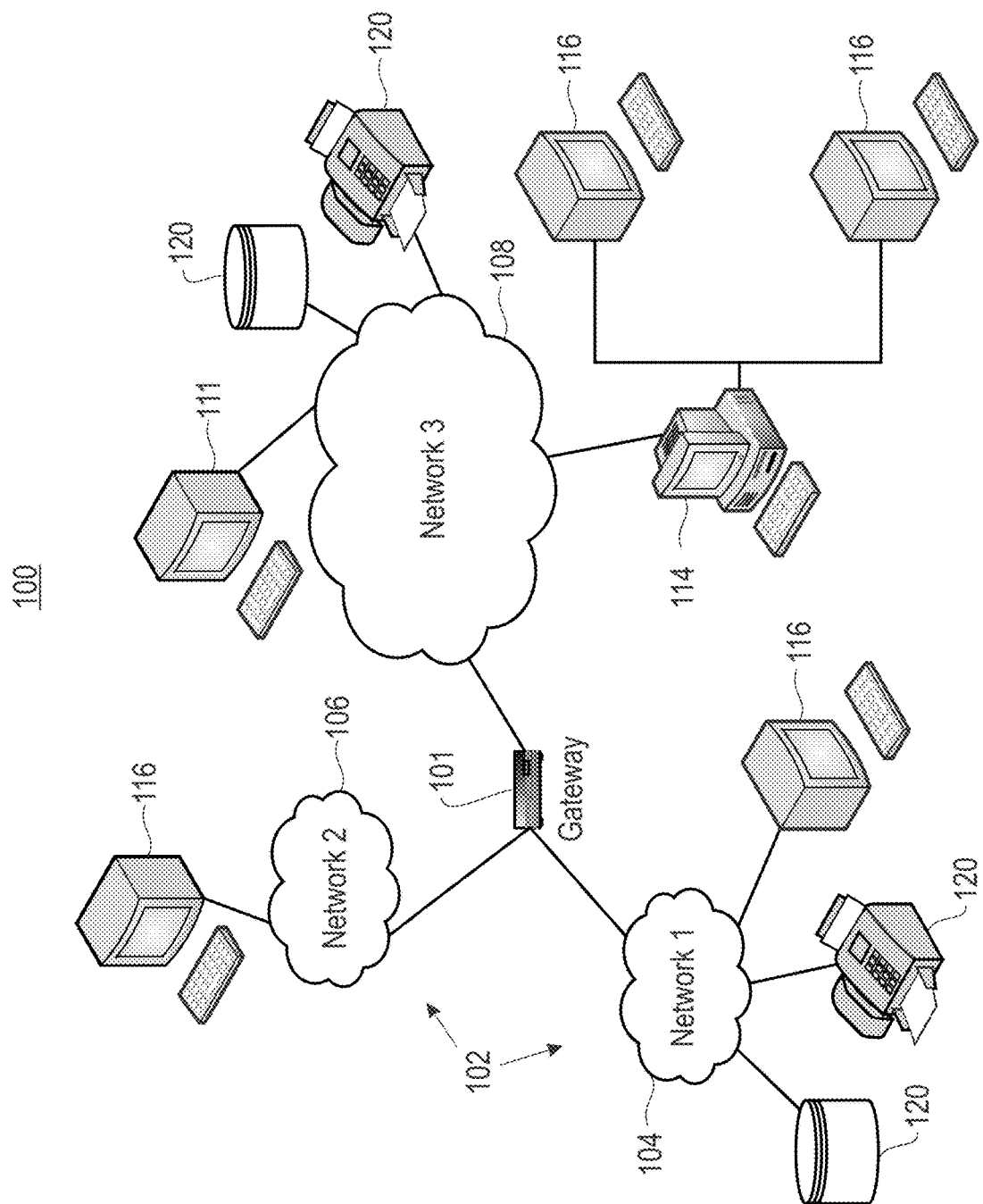
FIG. 1 illustrates a network architecture, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for producing explainable rules via deep learning.

In one general embodiment, a computer-implemented method includes receiving, at a deep neural network (DNN), a plurality of sentences each having an associated label; training the DNN, utilizing the plurality of sentences and associated labels; and producing a linguistic expression (LE) utilizing the trained DNN.

In another general embodiment, a computer program product for producing explainable rules via deep learning includes a computer readable storage medium having program instructions embodied therewith, where the computer readable storage medium is not a transitory signal per se, and where the program instructions are executable by a processor to cause the processor to perform a method including receiving, utilizing the processor at a deep neural network (DNN), a plurality of sentences each having an associated label; training the DNN, utilizing the processor and the plurality of sentences and associated labels; and producing a linguistic expression (LE) utilizing the trained DNN and the processor.

In another general embodiment, a system includes a processor; and logic integrated with the processor, executable by the processor, or integrated with and executable by the processor, where the logic is configured to receive, at a deep neural network (DNN), a plurality of sentences each having an associated label; train the DNN, utilizing the plurality of sentences and associated labels; and produce a linguistic expression (LE) utilizing the trained DNN.

In another general embodiment, a computer-implemented method includes identifying a collection of sentences having labels; inputting the sentences into a deep neural network (DNN) having several layers, the DNN analyzing the sentences and producing linguistic expressions (LEs) corresponding to the sentences; and in view of input from a human expert, modifying the linguistic expressions, wherein the modified linguistic expressions form a predictive model that, given an unlabeled sentence, predicts one or more labels for the unlabeled sentence.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
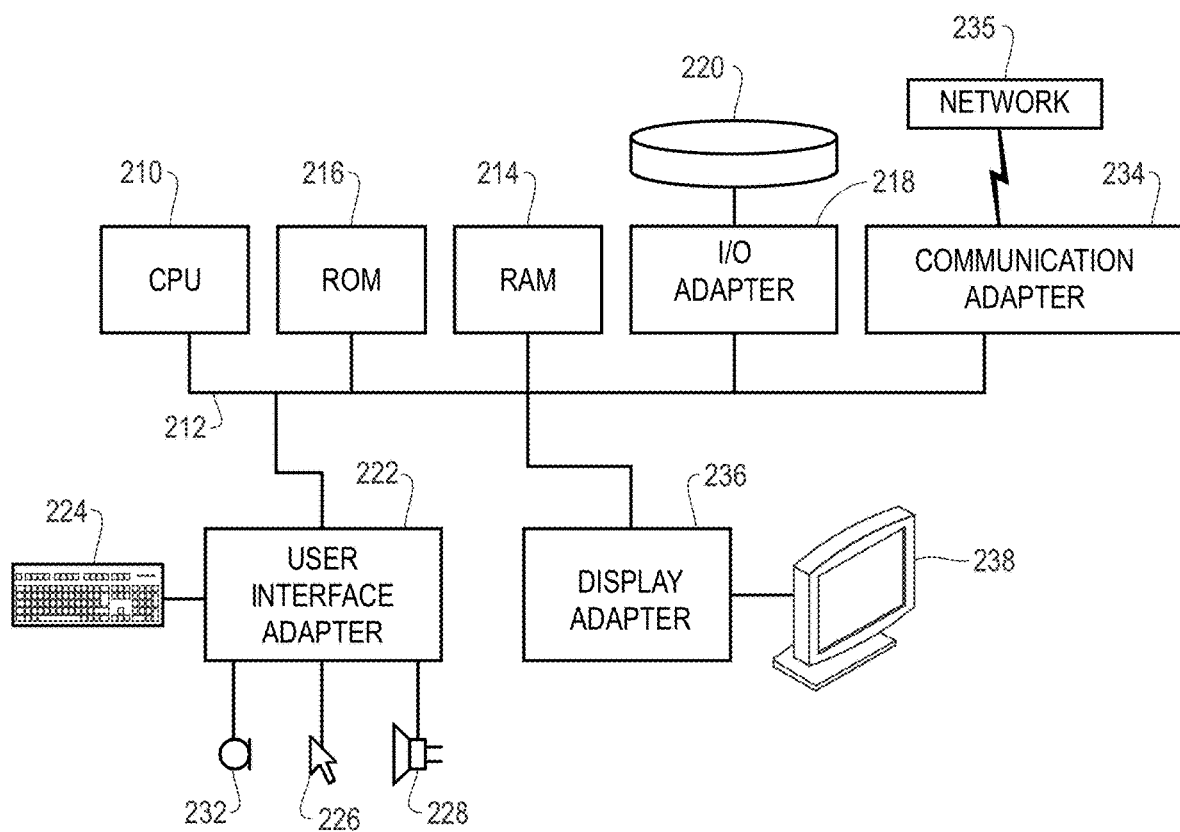
FIG. 2 shows a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
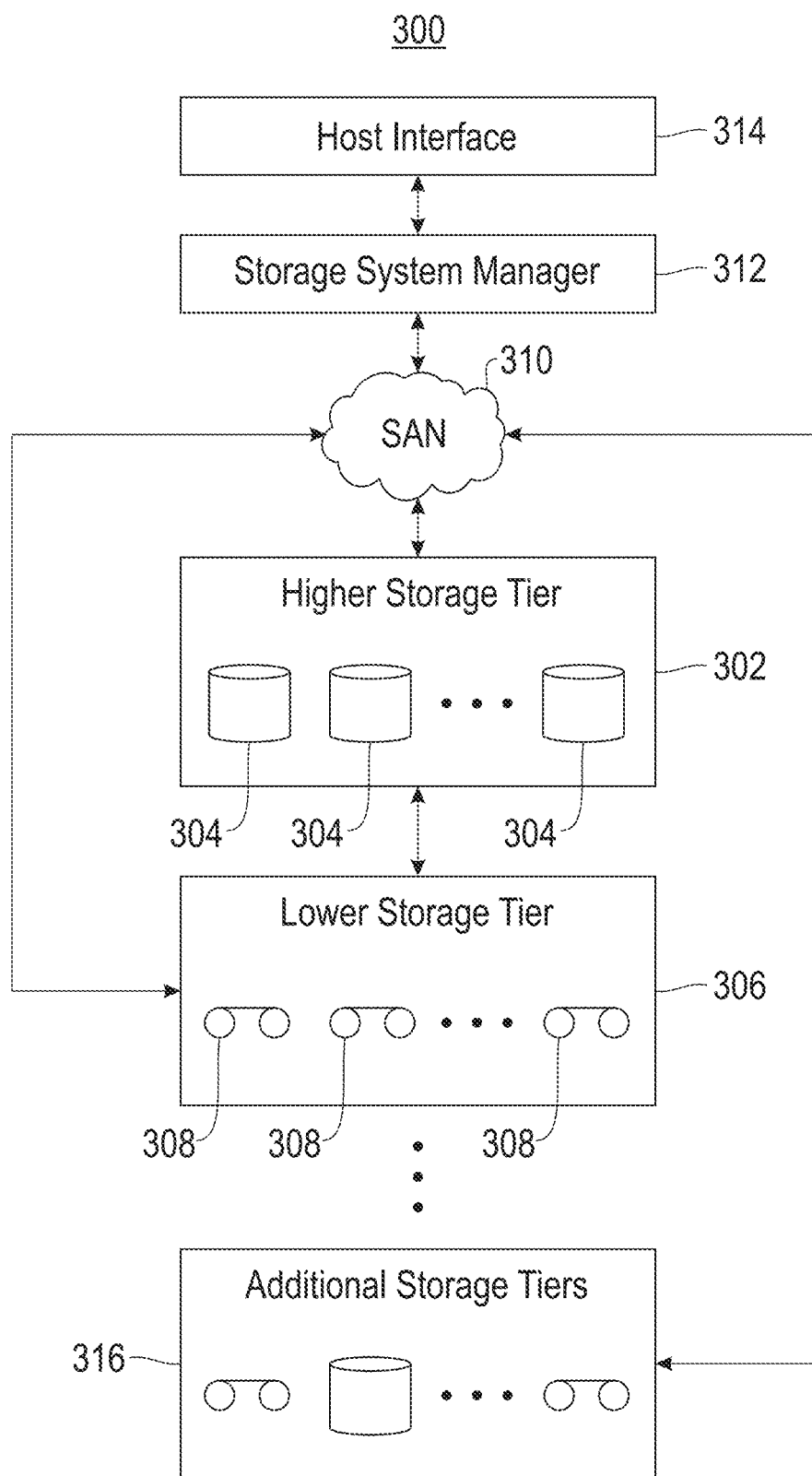
FIG. 3 illustrates a tiered data storage system in accordance with one embodiment of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Learning Explainable Classification Rules with Neural Logic Programming

While statistical modeling techniques have successfully tackled many applications, such models rarely lend themselves to easy interpretation. Using a real-world sentence classification use-case, it is possible to learn accurate models comprising higher-order abstractions expressed in a dialect with human-understandable semantics such as first-order logic. A neural network is provided that efficiently explores the space of relaxed formulas to learn rules that best explain the noisy labels in the data. This approach outperforms other approaches for learning rules from disparate areas such as multiple instance learning, statistical relational learning and prior rule-learning neural networks, both in terms of accuracy and scalability, while still being competitive with sentence classifiers comprising far less interpretable bi-directional long short-term memory units.

For many enterprise applications, interpretability of the learned model is very important. Especially when predictions affect revenue, the deployment of such a model to a customer-facing application is contingent upon an in-depth understanding of its inner workings and how much liability it can incur due to issues such as fairness. Deep learning has enabled learning of progressively larger models and attaining an in-depth understanding has become harder still. Explaining a prediction requires understanding the interplay among (possibly) millions of learned parameters—a daunting challenge to say the least.

Figure 4:
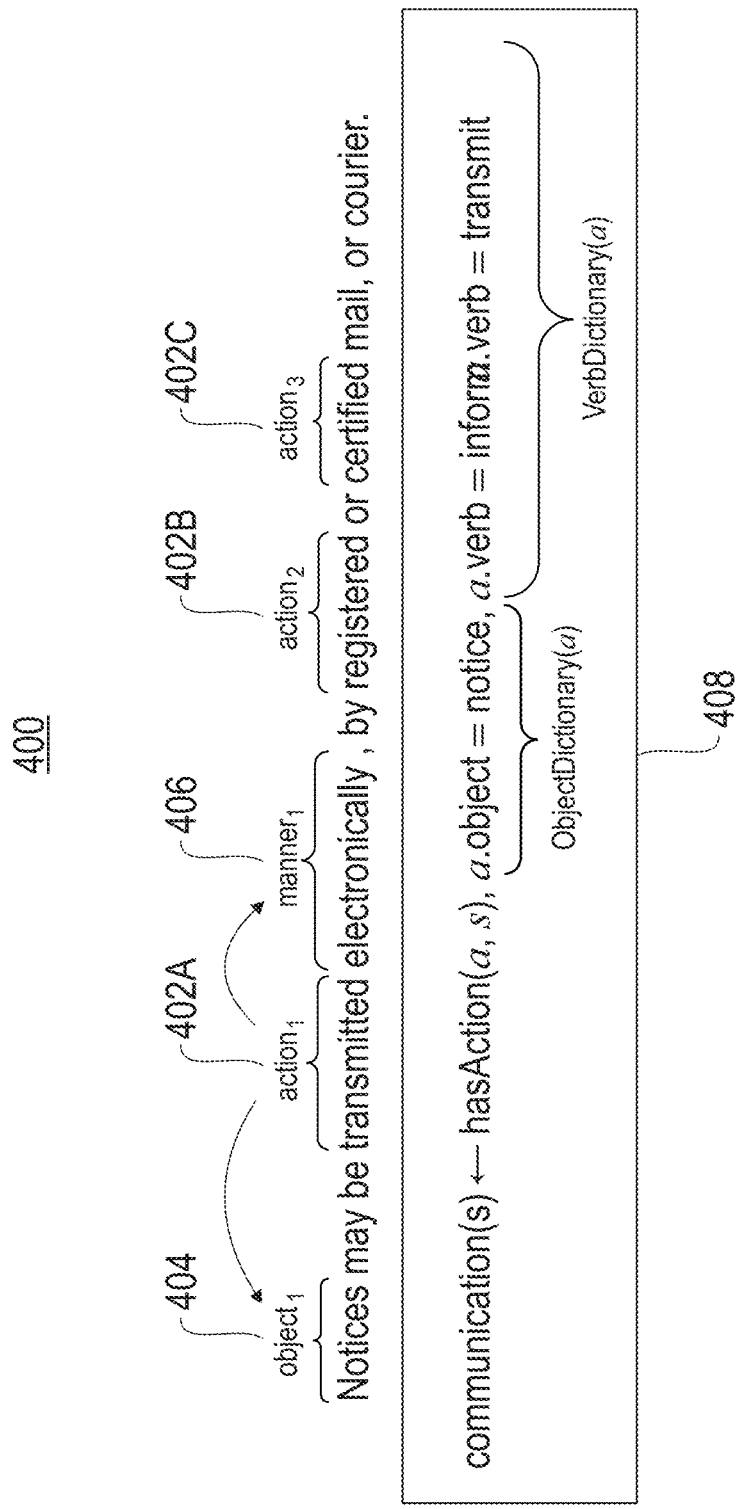
FIG. 4 illustrates a sentence from a real-world, legal contract along with its high-level linguistic abstractions extracted using semantic role labeling, in accordance with one embodiment of the present invention.

FIG. 4 illustrates a sentence 400 from a real-world, legal contract along with its high-level linguistic abstractions 402-406 extracted using semantic role labeling, according to one exemplary embodiment. The sentence 400 consists of three actions (or verbs) 402A-C for which we also show the relevant arguments such as its manner 406 (how the action is performed) and object 404 (what is the action referring to).

In one embodiment, a desired operation may include labeling communicative sentences, i.e., assigning the label communication to a sentence if it describes information exchange between the two parties involved in the contract. FIG. 4 shows a rule 408 that checks for three conditions:
 1) The action should belong to the sentence,
 2) its object should form a match with a dictionary of objects, and
 3) the surface form of the action should form a match with a dictionary of verbs.

The rule 408 evaluates to true on the sentence 400 because one of its constituent actions satisfies all the specified conditions. Despite the sentence containing a multitude of actions, attribution is clear since the rule only holds true for action1 407A. Moreover, due to the transparency and potential for explanation offered by rules, even for a domain expert who may not understand the learning algorithms employed, as long as they understand first-order logic and linguistic constructs, it is feasible for them to interpret such rules and modify them so as to achieve a desired behavior.

As opposed to statistical models, explainable models expressed in a dialect with clear semantics such as first-order logic have many advantages including but not limited to enabling:
 1) verification of model semantics,
 2) model improvement if feedback, e.g., label corrections, is available, and
 3) lower label complexity due to the strong inductive bias imposed by precise language semantics.

While inductive logic programming (ILP) focuses on learning logic programs, it is brittle: Unless there exists a set of logical rules that entails all positive examples and rejects the negatives, no rule is learned. Neuro-symbolic and neural network-based approaches are too computationally expensive or are not directly applicable for learning classification rules.

In one embodiment, rules for classification tasks may be learned. A logical rule may include a binary classifier whose head, the label relation, holds true if the instance satisfies the body predicates. A restricted rule may be implemented having a structure that not only allows for classifying independent and identically distributed (IID) instances but also collective classification, wherein features of related instances may be exploited.

Explainable Classification Rules

In one embodiment, the problem setting may be provided to describe how rules can help. Let $\mathcal{D} = \{(x_1, y_1), \ldots (x_n, y_n)\}$ denote a binary class, labeled sample such that each $x_i$ denotes an instance to be classified with label $y_i \in \{0, 1\}$ One goal may be to learn a function that assigns $x_i$ its label $y_i$, and because statistical classifiers, e.g. logistic regression and even neural networks, can be lacking when it comes to interpretability, first-order logic rules may be used.

Before describing the notation, the problem setting may be explained. In particular, the IID setting as well as settings where $x_i$ may be related to other instances $x_j$ are considered.

Let $\mathcal{P} = \{pred_1, \ldots pred_m\}$ denote a set of predicates where $pred(x_1, \ldots x_n) \in \{\top, \bot\}$ is an n-ary ground atom that evaluates to either true ($\top$) or false ($\bot$) if $x_i$ is a constant for all $i=1 \ldots n$; otherwise $x_i$ can be a logical variable that takes values from a domain of constants Dom. The central construct in a logic program is an if-then rule or clause:

$$R : h \forall b_1, b_2, \ldots b_n,$$

where R is an identifier for the clause, $b_1, \ldots, b_n$ denote its body such that $b_i \in \mathcal{P}, \forall i=1, \ldots n$, and h denotes the head predicate. If the body is true then the head is also true, which in the context of classification, will usually be the label predicate l(x) which, in turn, when true implies that y=1. In one embodiment, clauses may be treated as binary classifiers. Usually, the goal is to learn not one but multiple clauses. Under the usual disjunctive semantics, all clauses that share the same head can be collapsed to one overall rule in disjunctive normal form (DNF):

$$l \leftarrow R_1 \vee \ldots \vee R_k \quad (1)$$

In the sequel, a focus may be made on learning clauses involving a binary predicate $r(x_1, x_2)$ that is true if instances $x_1$ and $x_2$ are related (instances are referred to as logical constants). In the above example, link( ) performs the role of r( ). Another special case of the framework is multiple instance learning where related instances of $x_i$ and $x_j$ form disjoint subsets of $\mathcal{D} \ \forall i, j$.

FIG. 4 is an instance of MIL since sentences are related to their constituent actions and an action of one sentence cannot be related to another sentence. IID classification ($R_1$ above) is also a special case since it can be represented with the identity relation such that $r(x_i, x_j)$ is true iff i=j. Especially in cases where predicates are automatically generated and form weak predictors (in the sense that when used on their own to predict labels they lead to low precision and potentially many false positives), it helps to form conjunctions of a multitude of them so as to improve precision. One goal is to learn clauses whose body consists of $x, x'$ $r(x, x')$, $\wedge_i pred_i(x')$ where $pred_i \in \mathcal{P}, \forall i$. The core learning task can now be stated as $$\underset{R_1, \ldots R_k}{\operatorname{argmax}} \sum_{(x,y) \in \mathcal{D}} y \delta(\ell(x)) + (1-y)(1 - \delta(\ell(x))) \quad (2)$$

such that:

$$R_i: \ell(x) \leftarrow r(x, x'), \bigwedge_{j=1}^{m} pred_j^i(x'), \forall i = 1, \ldots k$$

$$pred_j^i \in \mathcal{P}, \forall j = 1, \ldots m, \forall i = 1, \ldots k$$

where $\delta(z)$ is 1 if $z$ is true and 0 otherwise, and k (number of clauses) and m (maximum number of predicates per clause) denote user-defined parameters. Note that, the same predicate may be allowed to be repeated within a clause and across clauses, thus allowing clauses of varying length ($\cdot$ $p \wedge p = p$).

Learning Explainable Classification Rules with Neural Networks

To enable the use of statistical techniques for learning rules, the setting is recast into linear algebra notation. Given an instance $x_i$, let $\phi_i$ denote a binary-valued matrix whose columns correspond to predicates and rows correspond to related instances $j = \{x \ \mathcal{R}_i | r(x_i, x_j)\}$. More precisely, $$\phi^i \in \{0,1\}^{|\mathcal{R}_i| \times |\mathcal{P}|},$$

such that its (j, k)-th cell, $\phi^i_{j,k}$, is 1 if the jth related instance satisfies the kth predicate in P, and 0 otherwise. Arbitrary connectivity patterns are allowed among instances in r and in particular, it may be the case that $|\mathcal{R}_i| \neq |\mathcal{R}_j|$ for some $i \neq j$ (e.g., different sentences may contain a differing number of actions or different publications may contain a different number of citations). Such a matrix $\phi^i$ can be used to represent common logical operations.

For instance, let $\alpha^{pred} \in \{0,1\}^{|\mathcal{P}|}$ denote a one-hot encoding vector for $pred \in \mathcal{P}$ whose only 1 is in the pred-th position, then the matrix-vector multiplication $\phi^i \alpha^{pred}$ returns a vector whose jth cell is 1 if the jth related instance satisfies pred and 0 otherwise. Moreover, logical conjunction and disjunction can be expressed using element-wise operations:

$$\{p(x_j) \wedge p'(x_j) | r(x_i, x_j)\} \equiv (\phi^i \alpha^p) \odot (\phi^i \alpha^{p'})$$

$$\{p(x_j) \vee p'(x_j) | r(x_i, x_j)\} \equiv (\phi^i \alpha^p, \phi^i \alpha^{p'})$$

where $\odot$ denotes element-wise or Hadamard product and max denotes element-wise or cell-wise maximum between two vectors. The first and second operations compute the conjunction and disjunction of the responses of predicates $p, p' \in \mathcal{P}$ for each related instance, respectively.

Using these definitions of logical operations and given a clause $R : r(x,x') \wedge p_1(x') \wedge \ldots \wedge p_m(x')$, R's evaluation on instance $x_i$ denoted $R(x_i)$ may be expressed as:

$$R(x_i) = \max(\phi^i \alpha \ p_1) \odot \ldots \odot (\phi^i \alpha \ p_m),$$

where max selects the largest entry in the vector returned by the element-wise products. The above expression returns 1, iff instance x is related to an instance that satisfies all predicates $p_1$ through $p_m$.

With this machinery in place, we can now express Equation 2 in linear algebra notation:

$$\underset{\alpha_j^i}{\operatorname{argmax}} \sum_{(\phi, y) \in \mathcal{D}} (2y-1) \max_{i=1,\ldots k} \overbrace{\max_{j=1,\ldots m} \circ (\phi \alpha_j^i)}^{\text{evaluating } R_i \text{ on } \phi} \quad (3)$$

such that: $1 \alpha_j^i = 1, \alpha_j^i \in \{0, 1\}^{|\mathcal{P}|}, \forall 1 \leq j \leq m, \forall 1 \leq i \leq k$ where $\mathbb{1}$ denotes a row of 1s. This objective learns clauses $R_1, \ldots R_k$, each modeled using m one-hot encodings $\alpha_1 i, \ldots \alpha_m i$ that constitute the learnable parameters, such that positive instances (y=1) are assigned higher scores than negative instances (y=0).

As noted in Equation 1, the k clauses form a DNF to model the target relation l(x) (represented by max $i = 1 \ldots k$ in the objective). This learning objective may enforce one-hot constraints, i.e., $\alpha_j{}^i \in \{0, 1\}|\mathcal{P}|$, and training with relaxed, non-negativity constraints where only $\alpha_j{}^i$ is enforced forms a legal distribution, i.e., $\mathbb{1}\alpha_j{}^i = 1$, $\alpha_j{}^i \geq 0$, may also be used.

Also, as a matter of notational convenience, $\{\alpha_j{}^i\}_{i=1}{}^k$ may be packed as columns of matrix $\Lambda_j \in [0, 1]^{|\mathcal{P}| \times k}$ which allows replacement of the two max's in the objective into a single max that retrieves the largest entry from the matrix computed by $(\phi\Lambda_1) \odot \ldots \odot (\phi\Lambda_m)$. A neural network may then be devised that can employ standard gradient based optimization techniques to learn clauses.

Figure 5:
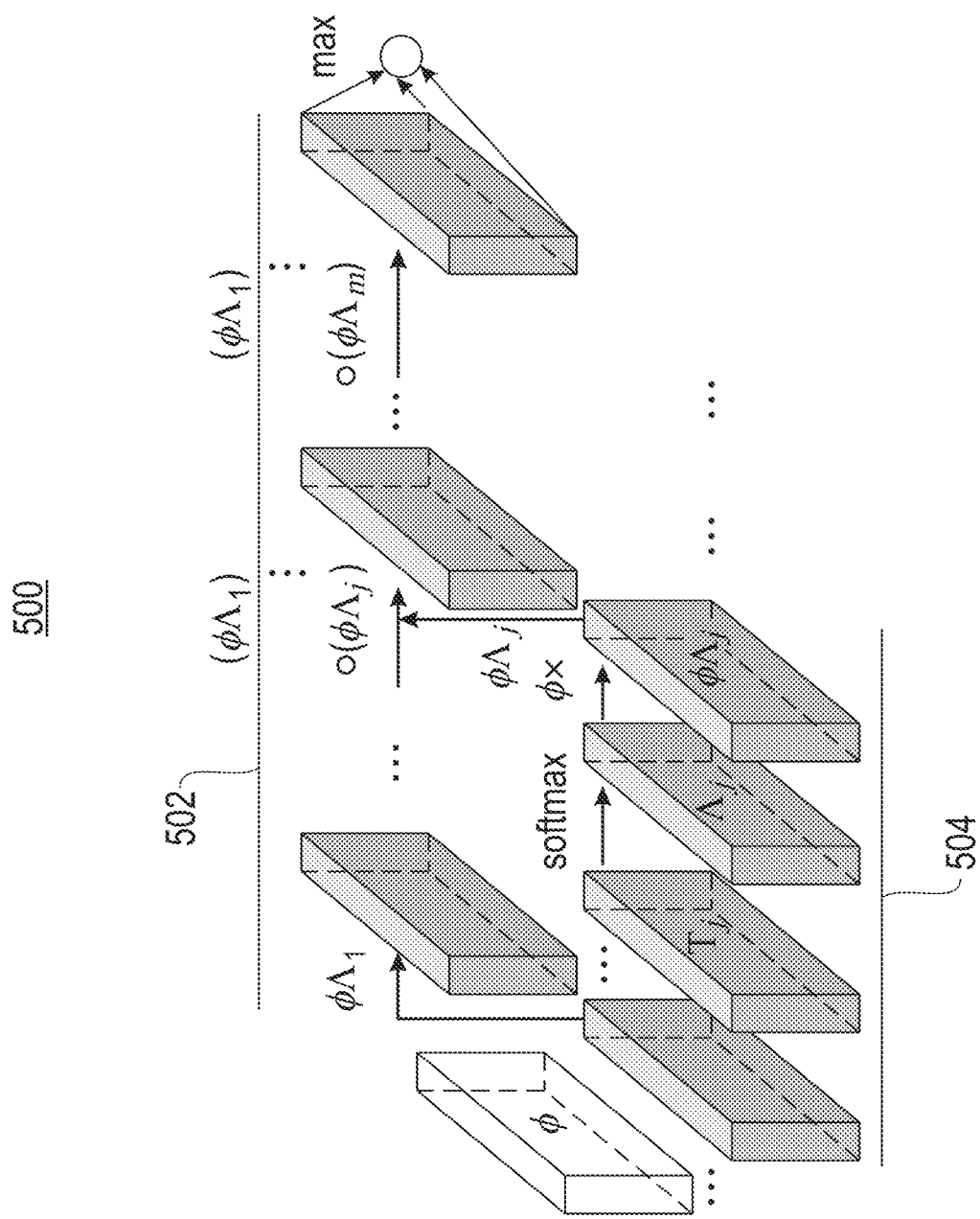
FIG. 5 illustrates an exemplary neural network for learning classification rules, in accordance with one embodiment of the present invention.

FIG. 5 shows an exemplary neural network 500 for learning classification rules that has an upper branch 502 and a lower branch 504. Given $\phi$ from $D$ which forms the input, each jth subsequent layer in the upper branch 502 computes conjunctions up until the jth predicate for all k clauses being learned. This is achieved by using the lower branch to compute all $\alpha_j{}^i \forall i=1, \ldots k$, from auxiliary variables $\gamma_j^i, \forall i=1, \ldots, k$, using a softmax transformation that ensures $\alpha_j{}^i$ is a legal distribution.

More precisely, let $\Gamma_j \in \mathcal{P}|\mathbb{R}|^{\times k}$ denote a matrix of auxiliary parameters whose ith column contains $\gamma_j^i$ and $\Lambda_j \in [0, 1]^{|\mathcal{P}| \times k}$ whose ith column contains $\alpha_j{}^i$ such that softmax($\gamma_j^i$)=$\alpha_j{}^i$. The corresponding jth hidden layer in the upper branch then:

1) Computes $\phi\Lambda_j$ which produces an matrix where $|R| \times k$ denotes the set of related instances for input $\phi$, and
2) Hadamard products it with the conjunctions for all clauses up until the (j−1)th predicate produced by the previous layer.

$(\phi\Lambda_1) \odot \ldots \odot (\phi\Lambda_m)$ produced by the last layer is then max-pooled into a single value, coalescing both inner and outer max operations in Equation 3. Gradients computed via backpropagation are used to update $\Gamma_j$, that are then used to re-compute $\Lambda_j$ for the next iteration. For inference, the portion of the network referring to $\Gamma_j, \forall j=1, \ldots, m$ is removed, and the remainder is invoked with the learned $\Lambda_j, \forall j=1, \ldots, m$.

As shown above, a specific kind of rule may be devised to solve a task of general interest (classification) that can represent well known classification tasks as special cases (e.g., multiple instance learning, collective classification). Accurate rules may be learned while scaling up to real-world problem sizes.

In one embodiment, semantic linguistic structures may be used from natural language processing (NLP). Sentences may be broken down into high-level structures, such as verbs and its arguments doer/object/manner, verb properties such as tense, voice, etc. Linguistic structures can then be used to define predicates. The neural network may accept an input sentence in terms of its constituent verbs and how they respond to such predicates.

Figure 6:
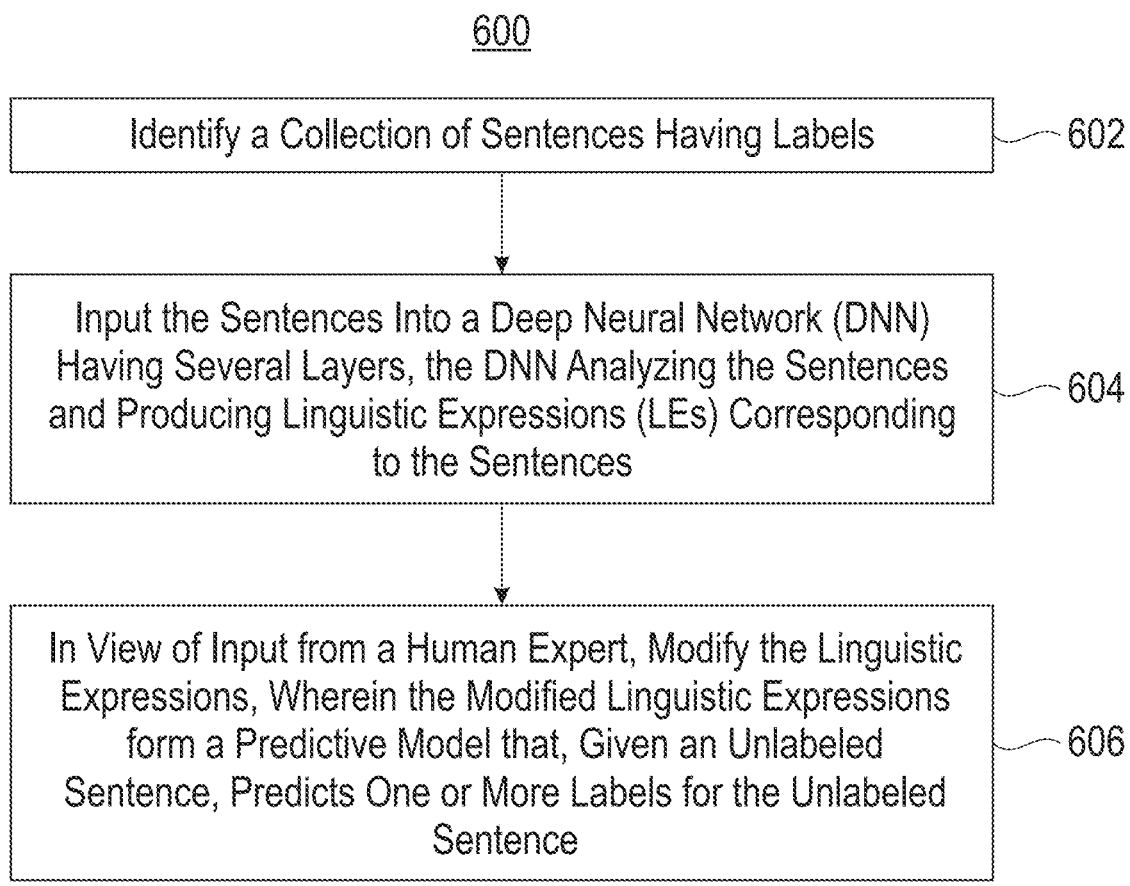
FIG. 6 illustrates a method for training a predictive model, in accordance with one embodiment of the present invention.

Now referring to FIG. 6, a flowchart of a method 600 for training a predictive model is shown according to one embodiment. The method 600 may be performed in accordance with the present invention in any of the environments depicted in FIGS. 1-5, among others, in various embodiments. Of course, greater or fewer operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where sentences having labels are identified. Additionally, method 600 may proceed with operation 604, where the sentences are input into a deep neural network (DNN) having several layers, the DNN analyzing the sentences and producing linguistic expressions (LEs) corresponding to the sentences. In one embodiment, there may not be a one-to-one correspondence between the number of LEs and the number of sentences. Further, method 600 may proceed with operation 606, where in view of input from a human expert, the LEs are modified, wherein the modified LEs form a predictive model that, given an unlabeled sentence, predicts one or more labels for the unlabeled sentence.

In one embodiment, the predictive model undergoes iterative refinement in view of its quality. In another embodiment, the method further includes (a) choosing a subset of sentences and their corresponding labels from the collection of sentences; (b) for each sentence in the subset, feeding it as input to the DNN and propagating it through all of the DNN's layers until its predicted label is obtained as output from the DNN, at which point the predicted label is compared with its correct label, and the corresponding error is computed (the forward pass); (c) backpropagating the computed error to update conditions included in the LEs (the backward pass); and (d) repeating steps (b) and (c) for one or more additional subsets in the collection of sentences.

In another embodiment, between the input and output layers, the DNN includes an intermediate layer for each condition in the LE. For example, if LEs having five conditions are to be trained, the network architecture could comprise five layers, excluding the input and output layers.

In yet another embodiment, each of the intermediate layers is responsible for identifying a condition to include into the LE. In another embodiment, a collection of LEs may be trained such that the sentences that satisfy the LEs have the correct label, and the sentences that do not satisfy the LEs do not have a label.

Figure 7:
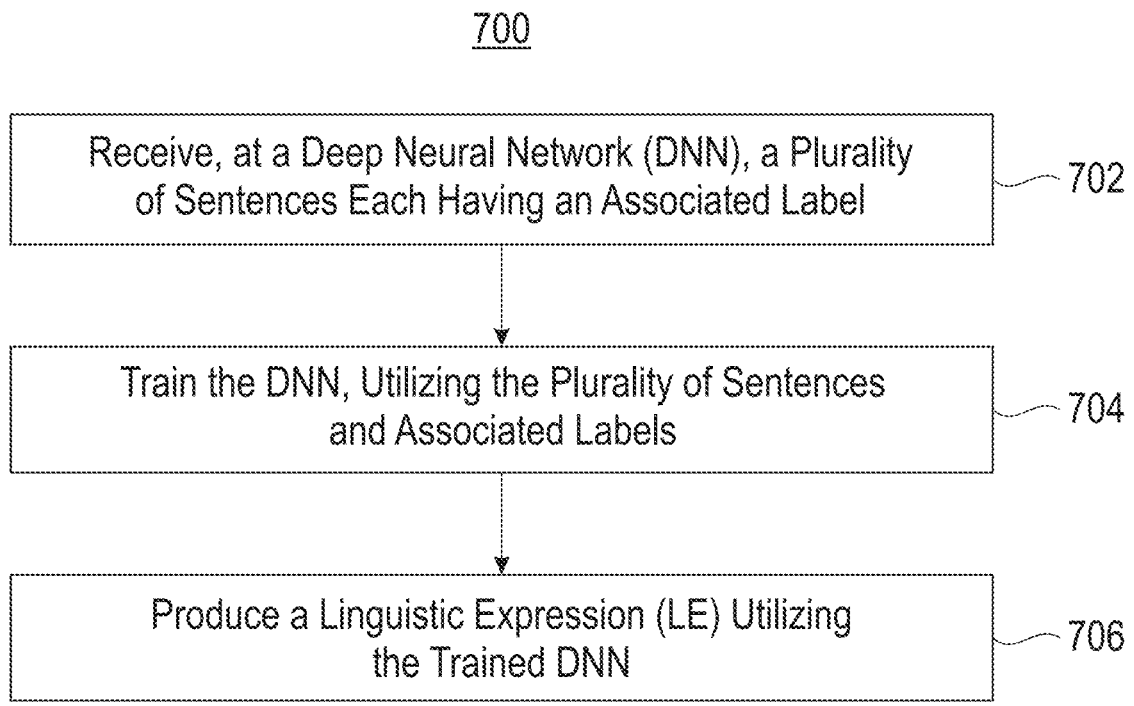
FIG. 7 illustrates a method for producing explainable rules via deep learning, in accordance with one embodiment of the present invention.

Now referring to FIG. 7, a flowchart of a method 700 is shown according to one embodiment. The method 700 may be performed in accordance with the present invention in any of the environments depicted in FIGS. 1-5, among others, in various embodiments. Of course, greater or fewer operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a plurality of sentences each having an associated label is received at a deep neural network (DNN). In one embodiment, the plurality of labeled sentences may constitute training data for the DNN. In another embodiment, the plurality of labeled sentences may be received from a data store (e.g., one or more databases, etc.). In yet another embodiment, the plurality of labeled sentences may each include a plurality of words grouped in a predetermined format.

Additionally, in one embodiment, the plurality of labeled sentences may each include a subject and a predicate, and may convey a statement. In another embodiment, the DNN may include an artificial neural network (ANN) having multiple layers between an input layer and an output layer of the DNN. In yet another embodiment, the DNN may determine a mathematical manipulation to transform input into output. For example, the DNN may take a sentence as input, and may output an associated label for the sentence.

Further, in one embodiment, the plurality of labeled sentences may each include an instance of training data. In another embodiment, the associated label for each sentence may be pre-assigned. For example, the label may be determined for the sentence by one or more users.

Further still, in one embodiment, the associated label for each sentence may identify one or more aspects of the sentence. For example, the label may identify one or more characteristics of the sentence, one or more features of the sentence, etc. In another example, the label may confirm that the sentence includes one or more predetermined characteristics. In yet another example, the label may confirm that the sentence does not include one or more predetermined characteristics.

Also, method 700 may proceed with operation 704, where the DNN is trained utilizing the plurality of sentences and associated labels. In one embodiment, for each of the plurality of sentences, the DNN may be trained to determine and output the associated label for the sentence. In another embodiment, the DNN may be refined via iterative training.

For example, a subset of the plurality of labeled sentences may be input into the DNN. In another example, each sentence within the subset may be propagated through all layers of the DNN to determine a predicted label for the sentence. In yet another example, the predicted label for the sentence may be compared to the assigned label for the sentence to determine a computed error. In still another example, the computed error may be back-propagated through the DNN. In another example, the DNN may be adjusted to minimize the computed error.

In addition, method 700 may proceed with operation 706, where a linguistic expression (LE) is produced utilizing the trained DNN. In one embodiment, the DNN may be used to produce one or more LEs for the sentence, where the one or more LEs identify the associated label for the sentence. In another embodiment, the DNN may include a plurality of intermediate layers.

Furthermore, in one embodiment, each of the plurality of intermediate layers may correspond to a condition within a predictive model used to perform the determination of the label. In another embodiment, each condition within the predictive model may be derived from one of the plurality of intermediate layers. For example, the predictive model may include a linguistic expression (LE). In another example, a linguistic expression may include a rule that assigns a label to the sentence if each of the conditions within the linguistic expression are met.

Further still, in one embodiment, each of the conditions within the linguistic expression may correspond to a layer in the DNN, where the corresponding layer identifies a condition to include within the linguistic expression. In another embodiment, when training of the DNN is complete, each intermediate layer of the DNN may constitute a condition for the linguistic expression.

For example, each layer may be associated with a condition, and no two layers may be associated with the same condition. In another example, each layer may include all possible options for a predetermined condition and their associated probabilities. In yet another example, the option with the highest probability may be selected as a condition to be used within the linguistic expression.

Also, in one embodiment, the linguistic expression may be used to determine the associated label for the input sentence. In another embodiment, the linguistic expression may take the sentence as input and may produce the associated label as output. In yet another embodiment, linguistic expression may include a human-readable model.

For example, the linguistic expression may include a word-based rule model that includes one or more conditions and that is understandable by a human user. In another example, the one or more conditions of the linguistic expression may be applied to the sentence, and the results of such application may include the associated label for the sentence.

Additionally, in one embodiment, the linguistic expression may be applied to one or more sentences that do not have an associated label, utilizing one or more system resources. For example, for each of the one or more sentences, when each of the one or more conditions is met, the associated label may be assigned to the sentence. In another example, when one or more conditions is not met, an absence of the associated label may be assigned to the sentence.

For instance, the one or more conditions of the linguistic expression may determine whether an obligation exists within a sentence. In another example, the linguistic expression is applied to a sentence, and if each of the conditions of the linguistic expression are met for the sentence, the sentence is assigned a label indicating that an obligation exists within a sentence. In yet another example, if one or more of the conditions of the linguistic expression are not met for the sentence, the sentence is assigned a label indicating that an obligation does not exist within a sentence.

Further, in one embodiment, a plurality of linguistic expressions may be determined utilizing the trained DNN. In another embodiment, data instances other than a plurality of sentences may be used to train the DNN and determine the linguistic expression.

In this way, a linguistic expression (e.g., a predictive model) may be trained and produced utilizing a DNN trained with labeled sentences. This LE may be applied via a system other than the DNN to unlabeled sentences in order to assign a label to those sentences. Additionally, the linguistic expression produced by the DNN may be transparent utilizing first-order logic rules, such that the conditions within the linguistic expression may be easily readable and adjustable by a human or computing application/process. As a result, clarity of the linguistic expression produced by the DNN may be improved, and the linguistic expression may be more easily adjustable over time, which may improve a performance of such linguistic expression and may reduce an amount of computing resources (e.g., processing, storage, etc.) necessary to perform such adjustments of the linguistic expression. Further, the linguistic expression may be used to label unlabeled data in an efficient and expedited manner, which may reduce an amount of computing resources necessary to perform such labeling.

Figure 8:
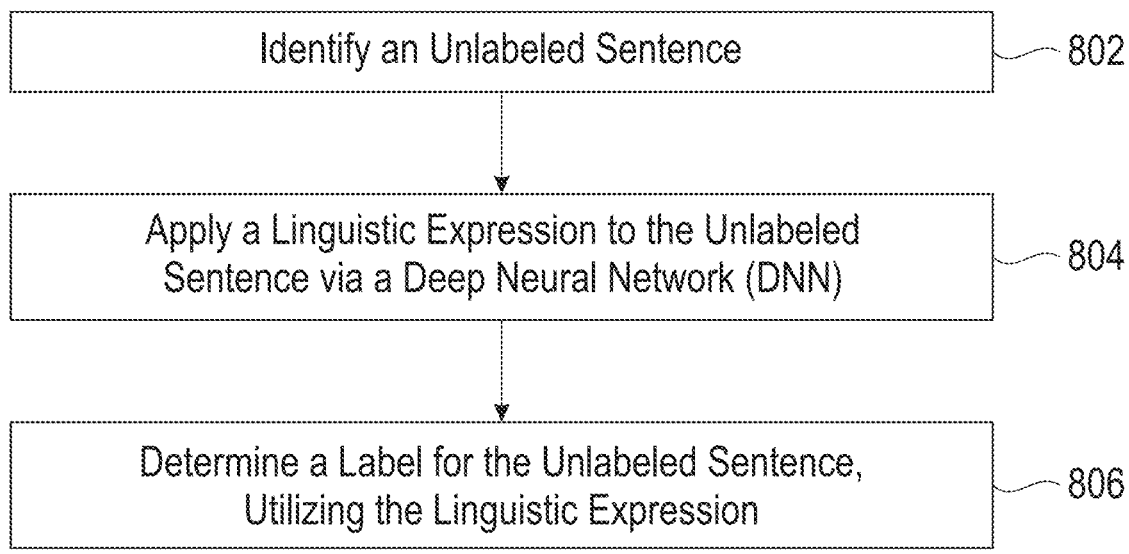
FIG. 8 illustrates a method for applying a linguistic expression, in accordance with one embodiment of the present invention.

Now referring to FIG. 8, a flowchart of a method 800 for applying a linguistic expression is shown according to one embodiment. The method 800 may be performed in accordance with the present invention in any of the environments depicted in FIGS. 1-5, among others, in various embodiments. Of course, greater or fewer operations than those specifically described in FIG. 5 may be included in method 800, as would be understood by one of skill in the art upon reading the present descriptions.

Each of the steps of the method 800 may be performed by any suitable component of the operating environment. For example, in various embodiments, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where an unlabeled sentence is identified. In one embodiment, unlabeled sentence may include a sentence that does not have an associated label identifying one or more aspects of the sentence. In another embodiment, the unlabeled sentence may be retrieved from a data store, from one or more documents, etc.

Additionally, method 800 may proceed with operation 804, where a linguistic expression is applied to the unlabeled sentence via a deep neural network (DNN). In one embodiment, the linguistic expression may be produced using a trained DNN. In another embodiment, the trained DNN may be trained with labeled training data (e.g., a plurality of sentences with corresponding predetermined labels). In yet another embodiment, each condition within the linguistic expression may correspond to an intermediate layer within the trained DNN.

Further, method 800 may proceed with operation 806, where a label is determined for the unlabeled sentence, utilizing the linguistic expression. In one embodiment, each of the conditions within the linguistic expression may be applied to the unlabeled sentence to determine a label for the sentence. In another embodiment, if each of the conditions of the linguistic expression is met for the sentence, the sentence is assigned a label indicating that a predetermined characteristic exists within a sentence. In yet another embodiment, if one or more of the conditions of the linguistic expression are not met for the sentence, the sentence is assigned a label indicating that the predetermined characteristic does not exist within a sentence.

In this way, a linguistic expression may be used to determine a label for an unlabeled sentence.

Figure 9:
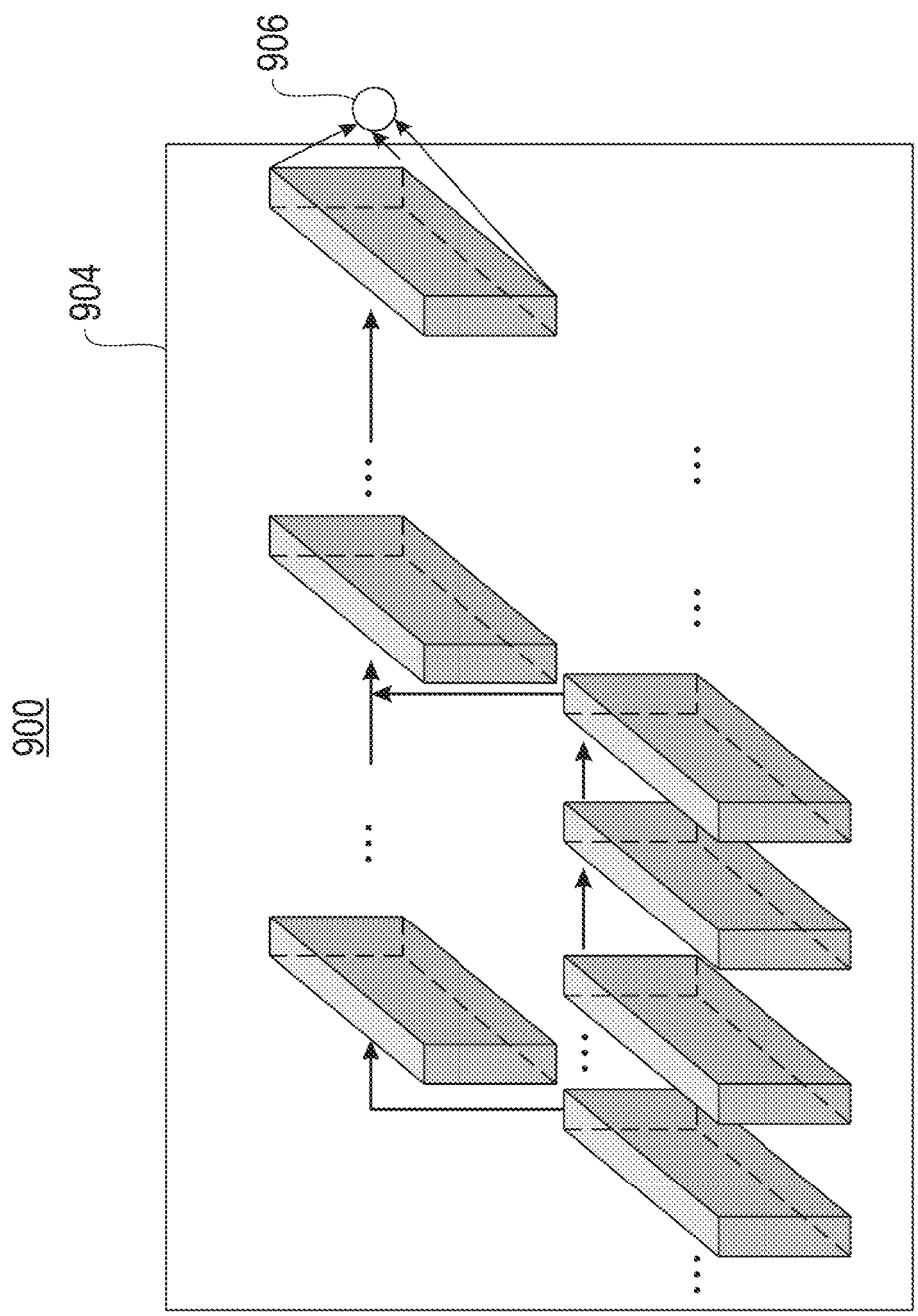
FIG. 9 illustrates an exemplary neural network architecture, in accordance with one embodiment of the present invention.

FIG. 9 illustrates an exemplary neural network architecture 900, according to one exemplary embodiment. As shown, a sentence 902 having an associated training label is used to train the layers 904 of the DNN. In one embodiment, each of the layers 904 corresponds to a condition within a predictive model used to perform the determination of a label 906 for the sentence 902. After receiving the sentence 902, the layers 904 of the DNN determine a predicted label 906 for the sentence 902.

In one embodiment, the predicted label 906 may be compared to the training label associated with the sentence 902. The results of the comparison may be back-propagated through the layers 904 of the DNN, which may in turn be adjusted to minimize a difference between the predicted label 906 and the training label. In this way, the layers 904 of the DNN may be trained to produce a predictive model.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    receiving, at a deep neural network (DNN), a plurality of sentences each having an associated label;
    training the DNN, utilizing the plurality of sentences and associated labels;
    producing a linguistic expression (LE) utilizing the trained DNN, wherein the linguistic expression includes a human-readable model, such that the linguistic expression includes a word-based rule that includes one or more human-readable conditions and that is understandable by a human user, wherein the DNN includes a plurality of intermediate layers, where each of the plurality of intermediate layers corresponds to a condition within the linguistic expression used to perform a determination of a label;

outputting the word-based rule of the human-readable model for output in readable form to the human user;

receiving input from the human user specifying how to adjust at least one of the conditions of the word-based rule;

modifying the at least one condition according to the user input;

receiving an unlabeled sentence;

applying the linguistic expression with the at least one modified condition to the unlabeled sentence for determining a label for the unlabeled sentence; and in response to determining that one or more conditions of the linguistic expression is not met for the unlabeled sentence, assigning a label to the unlabeled sentence indicating that the condition is not met.

2. The computer-implemented method of claim 1, wherein the DNN is refined via iterative training, where:
a subset of the plurality of sentences is input into the DNN,
each sentence within the subset is propagated through all layers of the DNN to determine a predicted label for the sentence,
the predicted label for the sentence is compared to the associated label for the sentence to determine a computed error,
the computed error is back-propagated through the DNN, and
the DNN is adjusted to minimize the computed error.

3. The computer-implemented method of claim 1, wherein each condition within the human-readable model is derived from one of a plurality of intermediate layers within the DNN.

4. The computer-implemented method of claim 1, wherein when training of the DNN is complete, each intermediate layer of the DNN constitutes a condition for the linguistic expression.

5. The computer-implemented method of claim 1, wherein the linguistic expression takes a sentence as input and produces the associated label as output.

6. The computer-implemented method of claim 1, comprising receiving unlabeled sentences; and predicting, using a system other than the DNN, one or more labels for the unlabeled sentences using the word-based rule model that includes the at least one modified condition.

7. The computer-implemented method of claim 1, further comprising computing an error corresponding to a predicted label compared with its correct label; and backpropagating the computed error to further update conditions included in the linguistic expressions.

8. The computer-implemented method of claim 1, further comprising applying the linguistic expression with the at least one modified condition to one or more sentences that do not have an associated label, wherein for each of the one or more sentences that does not have an associated label, in response to determining that each of the one or more conditions of the linguistic expression is met, the associated label is assigned to a sentence.

9. The computer-implemented method of claim 1, further comprising applying the linguistic expression with the at least one modified condition to one or more sentences that do not have an associated label via a system other than the DNN for assigning labels to the sentences that do not have an associated label.

10. The computer-implemented method of claim 1, wherein the DNN is used to produce multiple different LEs for a single one of the sentences, the multiple LEs identifying the associated label for the single sentence.

11. A computer program product for producing explainable rules via deep learning, the computer program product comprising a computer readable storage medium having program instructions embodied therewith, the program instructions executable by a processor to cause the processor to perform a method comprising:

receiving, utilizing the processor at a deep neural network (DNN) having a plurality of intermediate layers, a plurality of sentences each having an associated label;

training the DNN, utilizing the processor and the plurality of sentences and associated labels;

producing a linguistic expression (LE) utilizing the trained DNN and the processor, the LE having a word-based rule model that includes a plurality of human-readable conditions that are understandable by a human user, wherein each condition within the LE is derived from one of a plurality of intermediate layers within the DNN;

outputting the LE in human-readable form for modification thereof by a human; receiving input from the human user specifying how to adjust at least one of the conditions of the word-based rule model;

modifying the at least one condition according to the user input;

selecting one of the sentences;

feeding the one of the sentences as input to the DNN for generating a predicted label for the one of the sentences;

computing an error corresponding to the predicted label compared with its correct label;

backpropagating the computed error to update conditions included in the linguistic expressions;

receiving an unlabeled sentence; and applying the linguistic expression with the updated conditions to the unlabeled sentence for determining a label for the unlabeled sentence in response to determining that one or more conditions of the linguistic expression with the updated conditions is not met for the unlabeled sentence, assigning a label indicating that the condition is not met is assigned to the unlabeled sentence.

12. The computer program product of claim 11, wherein the DNN is refined via iterative training, where:
a subset of the plurality of sentences is input into the DNN,
each sentence within the subset is propagated through all layers of the DNN to determine a predicted label for the sentence,
the predicted label for the sentence is compared to the associated label for the sentence to determine a computed error,
the computed error is back-propagated through the DNN, and
the DNN is adjusted to minimize the computed error.

13. The computer program product of claim 11, wherein the DNN includes a plurality of intermediate layers, where each of the plurality of intermediate layers corresponds to a condition within the linguistic expression used to perform a determination of a label.

14. The computer program product of claim 11, wherein the DNN is used to produce multiple different LEs for a single one of the sentences, the multiple LEs identifying the associated label for the single sentence.

15. The computer program product of claim 11, wherein when training of the DNN is complete, each intermediate layer of the DNN constitutes a condition for the linguistic expression.

16. The computer program product of claim 11, wherein the linguistic expression with the updated conditions takes a sentence as input and produces the associated label as output.

17. The computer program product of claim 11, comprising program instructions for: outputting the word-based rule of the model for output in readable form to the human user; receiving input from the human user specifying how to adjust at least one of the conditions of the word-based rule; and modifying the at least one condition according to the user input.

18. The computer program product of claim 11, further comprising program instructions executable by the processor to cause the processor to apply the linguistic expression with the updated conditions to one or more sentences that do not have an associated label, utilizing a system other than the DNN.

19. The computer program product of claim 18, wherein for each of the one or more sentences that does not have an associated label, in response to determining that each of the one or more conditions of the linguistic expression is met, the associated label is assigned to a sentence.

20. A system, comprising:
a processor; and
logic integrated with the processor, executable by the processor, or integrated with and executable by the processor, the logic being configured to:
receive, at a deep neural network (DNN), a plurality of sentences each having an associated label;
train the DNN, utilizing the plurality of sentences and associated labels;
produce a linguistic expression (LE) utilizing the trained DNN, wherein the linguistic expression includes a human-readable model, such that the linguistic expression includes a word-based rule that includes one or more human-readable conditions and that is understandable by a human user,
wherein the DNN includes a plurality of intermediate layers, where each of the plurality of intermediate layers corresponds to a condition within the linguistic expression used to perform a determination of a label;
outputting the word-based rule of the human-readable model for output in readable form to the human user;
receiving an instruction from the human user specifying how to adjust at least one of the conditions of the word-based rule;
modifying the at least one condition according to the instruction for updating the at least one condition;
computing an error corresponding to a predicted label compared with its correct label;
backpropagating the computed error to further update conditions included in the linguistic expressions;
receiving unlabeled sentences;
applying the linguistic expression with the updated conditions to the unlabeled sentences for determining labels for the unlabeled sentences; and
in response to determining that one or more conditions of the linguistic expression is not met for one of the sentences, assigning a label to the one of the sentences indicating that the condition is not met.

21. A computer-implemented method, comprising:
identifying a collection of sentences having labels;
inputting the sentences into a deep neural network (DNN) having several layers, the DNN analyzing the sentences and producing linguistic expressions (LEs) corresponding to the sentences, each of the linguistic expression including a human-readable model having a word-based rule that includes one or more human-readable conditions;
outputting the human-readable models of the linguistic expressions to a human expert for reading of the human-readable models by the human expert;
receiving input from the human expert in response to outputting the human-readable models, the input being for adjusting one or more conditions of the human-readable models;
in response to receiving the input from the human expert, modifying the linguistic expressions, wherein the modified linguistic expressions form a predictive model that, given an unlabeled sentence, predicts one or more labels for the unlabeled sentence;
(a) choosing a subset of sentences and their corresponding labels from the collection of sentences;
(b) for each sentence in the subset, feeding the sentence as input to the DNN and propagating it through all of the DNN's layers until its predicted label is obtained as output from the DNN, at which point the predicted label is compared with its correct label, and a corresponding error is computed;
(c) backpropagating the computed error to update conditions included in the linguistic expressions; and
repeating steps (b) and (c) for one or more additional subsets in the collection of sentences;
receiving an unlabeled sentence;
applying the linguistic expression with the updated conditions to the unlabeled sentence for determining a label for the unlabeled sentence; and
in response to determining that one or more conditions of the linguistic expression with the updated conditions is not met for the unlabeled sentence, assigning a label to the unlabeled sentence indicating that the condition is not met.

22. The computer-implemented method of claim 21, wherein the predictive model undergoes iterative refinement in view of its quality.

23. The computer-implemented method of claim 21, wherein the several layers of the DNN include an intermediate layer for each condition in the linguistic expressions.

24. The computer-implemented method of claim 21, wherein the backpropagating includes a backward pass through the DNN.

* * * * *